United States Patent [19]
Gerlach et al.

[11] Patent Number: 6,058,454
[45] Date of Patent: May 2, 2000

[54] METHOD AND SYSTEM FOR AUTOMATICALLY CONFIGURING REDUNDANT ARRAYS OF DISK MEMORY DEVICES

[75] Inventors: Ralph John Gerlach, Austin; Dale Arthur Legband, Pflugerville; Scott Lyon Porter, Austin, all of Tex.

[73] Assignee: International Business Machines Corporation, Armonk, N.Y.

[21] Appl. No.: 08/936,228

[22] Filed: Jun. 9, 1997

[51] Int. Cl.[7] .............................. G06F 12/00; G06F 13/00; G06F 11/00
[52] U.S. Cl. .............................. 711/114; 711/4; 711/112; 711/170; 714/7; 714/6; 714/3; 713/100; 713/1; 710/10; 710/8; 710/11; 710/104
[58] Field of Search .................................. 711/114, 112, 711/115, 4, 170; 395/653, 182.01, 182.03, 182.05, 651, 182.04, 830, 828, 829, 831; 710/8, 9, 10, 11, 104; 713/1, 100; 714/3, 6, 7

[56] References Cited

U.S. PATENT DOCUMENTS

| | | | |
|---|---|---|---|
| 4,754,397 | 6/1988 | Varaiya et al. | 364/200 |
| 4,928,192 | 5/1987 | Bartlett et al. | 360/77.08 |
| 5,077,736 | 12/1991 | Dunphy, Jr. et al. | 371/10.1 |
| 5,140,592 | 8/1992 | Idleman et al. | 371/8.1 |
| 5,257,387 | 10/1989 | Richek et al. | 395/800 |
| 5,455,934 | 10/1995 | Holland et al. | 395/404 |
| 5,548,712 | 8/1996 | Larson et al. | 395/182.05 |
| 5,568,629 | 10/1996 | Gentry et al. | 395/441 |
| 5,794,032 | 4/1996 | Leyda | 395/652 |
| 5,822,782 | 10/1995 | Humlicek et al. | 711/170 |
| 5,838,891 | 3/1996 | Mizuno et al. | 395/182.03 |
| 5,854,942 | 9/1996 | Penokie | 395/830 |

*Primary Examiner*—Eddie P. Chan
*Assistant Examiner*—Kimberly McLean
*Attorney, Agent, or Firm*—Robert M. Carwell; Jack V. Musgrove; Andrew J. Dillon

[57] ABSTRACT

A method and system for autoconfiguring redundant arrays of memory storage devices contained within receptacles having one or more slots containing hardware sufficient to accept and electrically communicate with such memory storage devices. The capacities of the memory storage device receptacles for accepting memory storage devices are determined, and used to define an initial positioning of devices in at least one memory storage device receptacle. One or more asymmetrical groupings of memory storage devices is defined to permit an equation of electrically detected relative positions of the memory storage devices with actual physical positions within the receptacle. Thereafter, additional devices are added into the receptacles such that the ability to equate electrically detected relative positions of the devices with physical positions is preserved.

35 Claims, 11 Drawing Sheets

Fig. 6

| Row | Pre-Existing Disk Drawer Contents | New Partial Disk Drawer Contents | Pre-Existing Number of Disks on Loop A and Loop B | Number of Disks on Loop A and Loop B After Addition of New Disks | Additional Disks on Loop A and Loop B | Modulo 8 Count of New Disks Added on Loop A and Loop B | New Disks Added Between Disk Previously on Loop A and Loop B |
|---|---|---|---|---|---|---|---|
| Row 1 | Loop B: BBBMM_M<br>Loop A: MBBMM___ | | 3<br>3 | 6<br>5 | 3<br>2 | 3<br>2 | 0<br>2 |
| Row 2 | Loop B: MMMMMCCM<br>Loop A: MMMMMCCC | | 6<br>5 | 8<br>8 | 2<br>3 | 2<br>3 | 2<br>0 |
| Row 3 | Loop B: any valid group<br>Loop A: any valid group | Loop B: ___AA__A<br>Loop A: H__AA____ | X<br>Y | X+3<br>Y+3 | 3<br>3 | 3<br>3 | 0<br>0 |
| Row 4 | Loop B: BBBMMCCM<br>Loop A: MCCMMCCC | | 3<br>3 | 8<br>8 | 5<br>5 | 5<br>5 | 2<br>2 |
| Row 5 | Loop B: BBBMM_M<br>Loop A: MBBMM___ | Loop B: ___AA__A<br>Loop A: H__AA____ | 3<br>3 | 9<br>8 | 6<br>5 | 6<br>5 | 0<br>2 |
| Row 6 | Loop B: MMMMMCCM<br>Loop A: MMMMMCCC | Loop B: ___AA__A<br>Loop A: H__AA____ | 6<br>5 | 11<br>11 | 5<br>6 | 5<br>6 | 2<br>0 |
| Row 7 | Loop B: any valid group<br>Loop A: any valid group | Loop B: BBBAA__A<br>Loop A: HBBAA____ | X<br>Y | X+6<br>Y+5 | 6<br>5 | 6<br>5 | 0<br>0 |
| Row 8 | Loop B: BBBMMCCM<br>Loop A: MBBMMCCC | Loop B: ___AA__A<br>Loop A: H__AA____ | 3<br>3 | 11<br>11 | 8<br>8 | 0<br>0 | 2<br>2 |
| Row 9 | Loop B: BBBMM_M<br>Loop A: MBBMM___ | Loop B: BBBAA__A<br>Loop A: HBBAA____ | 3<br>3 | 12<br>10 | 9<br>7 | 1<br>7 | 0<br>2 |
| Row 10 | Loop B: MMMMMCCM<br>Loop A: MMMMMCCC | Loop B: BBBAA__A<br>Loop A: HBBAA____ | 6<br>5 | 14<br>13 | 8<br>8 | 0<br>0 | 2<br>0 |
| Row 11 | Loop B: BBBMMCCM<br>Loop A: MBBMMCCC | Loop B: BBBAA__A<br>Loop A: HBBAA____ | 3<br>3 | 14<br>13 | 11<br>10 | 3<br>2 | 2<br>2 |

METHOD AND SYSTEM FOR AUTOMATICALLY CONFIGURING REDUNDANT ARRAYS OF DISK MEMORY DEVICES

BACKGROUND OF THE INVENTION

1. Technical Field:

The present invention relates, in general, to a method and system to be utilized with a data storage subsystem. In particular, the present invention relates to a method and system to be utilized with a data storage subsystem which utilizes redundant arrays of memory storage devices. Yet still more particularly, the present invention relates to a method and system, to be utilized with a data storage subsystem which utilizes redundant arrays of memory storage devices, and which automatically and correctly configures memory storage devices within a data storage subsystem composed of either partially populated or fully populated redundant arrays of memory storage device drawers.

2. Description of the Related Art:

Modern computer systems often utilize a plurality of storage devices or memories in order to store data. Many such storage devices are categorized as so-called "direct access storage devices" (DASD) in that the access plan for data within such a device is effectively independent of the location of the data. One example of such a storage device is a magnetic disk drive memory.

As over all system processing speeds within modern computer systems increase, magnetic disk storage technology access times have lagged. As a consequence, several techniques have been proposed for increasing the data throughput for storage systems associated with computer systems. One such technique is the provision of a redundant array of disk memory devices. Such arrays are increasingly utilized as a result of the decreases in size and cost per megabyte for data storage within disk memory devices.

Utilizing arrays of disks can effectively increase data throughput by taking advantage of the fact that digital data are generally represented as blocks or strings of binary symbols (e.g., zeros and ones.). By utilizing an array of disks, different portions of the blocks or strings of binary symbols can be written in parallel, rather than writing each symbol one at a time (serially) as would be done if just one large disk were utilized. For example, if some data were represented by an eight bit string (e.g., 11001011), and if an array of four disks were utilized, data throughput could be increased over that available by serially writing such a string to one disk by writing each two contiguous bits of the string to each disk in the array in a parallel fashion (e.g., writing 11 to array disk one, 00 to array disk two, 10 to array disk three, and 11 to array disk four).

One technique for providing a redundant array of disk memory devices is the so-called "Redundant Array of Inexpensive Disks" (RAID) wherein a tightly coupled plurality of disk storage devices are arranged into an array to provide greater data throughput. These disk arrays provide high data reliability and availability. That is, the expected time to data loss is quite long and the time spent repairing systems and recovering lost data is a small fraction of total time.

RAID systems are now being offered commercially. Numerous disk array systems are available, incorporating from a few to many disk drives. The various options available are generally referred to within the art as "RAID-xx" systems, where "xx" is some number (e.g., 1, 3, 5, etc.) denoting the RAID system "level."

RAID system "levels" are shorthand for the way that disks are configured and data processed of within different types of RAID systems. For example, RAID level 1 generally utilizes N disks for storing data and N additional disks for "mirroring" data being written to first N disks. RAID level 3 systems generally utilize one or more groups of N+1 disks; within each group, N disks are utilized to store data, and the additional disk is utilized to store parity data (the utilization of which will allow better accuracy). RAID level 5 systems also generally utilize N+1 disks, but differ from RAID level 3 in that data is divided into larger subdivisions; furthermore, in RAID level 5 the parity information is distributed among disks.

The performance of different computer applications is optimized for different RAID level systems. For example, RAID level 1 is generally accepted to be best suited for applications requiring high data availability. RAID level 3 is best utilized with applications requiring large file transfers, and RAID level 5 provides optimum performance for applications requiring high I/O rates and small block sizes.

As referenced above, RAID systems are now being offered commercially. The systems are being offered as high speed, extremely accurate, fault tolerant, and cost effective mass storage options.

It is common within the industry to offer array systems in drawers which can contain up to some predefined number of data storage disks. For example, the International Business Machines Corporation (IBM) offers a RAID level 5 serial storage architecture (SSA) disk device for the storage of digitally encoded video content (e.g., MPEG (Moving Pictures Expert Group), AVI (Audio Video Interleave), or other formats understood by those within the art). These SSA devices are configured as 4+P (four disks plus one parity disk) RAID arrays with hot spare disks to provide protection from disk failures. The disks are installed in IBM 7133 SSA drawers containing a maximum of 16 disks configured as three 4+P arrays and one hot spare disk.

Generally, it is common that customers only purchase the amount of data storage that they need presently or in the foreseeable future. Furthermore, it is not unusual that at some point subsequent to the same customers desire to increase the storage amount of their pre-existing data storage systems. In either case, it is not unusual for the customers' data storage needs not to equal that provided by fully populated RAID array disk drawers.

Accordingly, the industry has responded by allowing users to purchase and utilize partially populated RAID array disk drawers. Such partially populated RAID array disk drawers can be utilized alone or with other fully populated drawers. The industry also allows disks to be added to the partially populated RAID array disk drawers at a later time so that the size of the data storage systems can grow with the needs of the user.

The disks within the RAID array disk drawers must be properly configured under the RAID system in order to utilize the RAID system to work correctly. It is typical within the industry for vendors to sell to customers either partially or fully populated disk drawers, or a combination of fully and partially populated disk drawers, and leave it up to the customers to correctly configure the disks in the RAID array disk drawers such that the RAID system being utilized functions correctly. Many customers find that the foregoing vendor practices are less than optimum.

The practices are less than optimum because leaving the problem of correctly configuring the disks in the RAID array disk drawers up to the customer requires that the customer retain an expert in RAID array systems and the operating system being utilized by the computing system with which the RAID array is to be utilized in order to ensure that the RAID arrays be correctly configured. Such a requirement often produces additional frustration and expense for customers.

It should therefore be apparent that a need exists for a method and system for enhanced data management within a data storage subsystem which utilizes redundant arrays of disk memory devices which automatically and correctly configures disks within a system composed of either partially populated or fully populated RAID array disk drawers.

SUMMARY OF THE INVENTION

It is therefore one object of the present invention to provide a method and system to be utilized with a data storage subsystem.

It is another object of the present invention to provide a method and system to be utilized with a data storage subsystem which utilizes redundant arrays of memory storage devices.

It is another object of the present invention to provide a method and system, to be utilized with a data storage subsystem which utilizes redundant arrays of memory storage devices, and which automatically and correctly configures memory storage device within a data storage subsystem composed of either partially populated or fully populated redundant arrays of memory storage device drawers.

The foregoing objects are achieved as is now described. Provided are a method and system for autoconfiguring redundant arrays of memory storage devices contained within one or more memory storage device receptacles where such receptacles have one or more slots containing hardware sufficient to accept and electrically communicate with such memory storage devices. The method and system accomplish their objects via the following. Determining the one or more memory storage device receptacles' capacities for accepting memory storage devices. Using the determined capacities to define an initial positioning of one or more memory storage devices in at least one memory storage device receptacle based upon the determined capacity of that at least one memory storage device. Using the determined capacities and the defined initial positioning to define one or more asymmetrical groupings of memory storage devices within the at least one memory storage device receptacle where the defined one or more asymmetrical groupings permit an equation of electrically detected relative positions of the one or more memory storage devices with actual physical positions of said memory storage devices within the at least one memory storage device receptacle. Thereafter, only adding additional memory storage devices into the at least one memory storage device receptacles in a fashion such that the ability to equate electrically detected relative positions of the one or more memory storage devices with physical positions of the one or more memory storage devices within the at least one memory storage device receptacle is preserved, wherein redundant arrays of memory storage devices can be autoconfigured from said one or more memory storage devices.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is llustration of the logic involved with respect to how the physical location of disks within a RAID system are determined in an illustrative embodiment of the present invention;

DETAILED DESCRIPTION OF ILLUSTRATIVE EMBODIMENT

The following description will focus upon applying the method and process of an illustrative embodiment of the present invention to one or more RAID array drawers which can contain up to sixteen disk storage devices. However, it will be recognized that the method and system of illustrative embodiments of the present invention are not restricted to drawers of merely sixteen disks, but instead can be generalized to handle drawers of different sizes. Furthermore, it will be recognized by those within the art that the method and process of illustrative embodiments of the present invention can be utilized with any data storage medium that utilizes the concept of an array of data storage medium elements.

Figure 1:
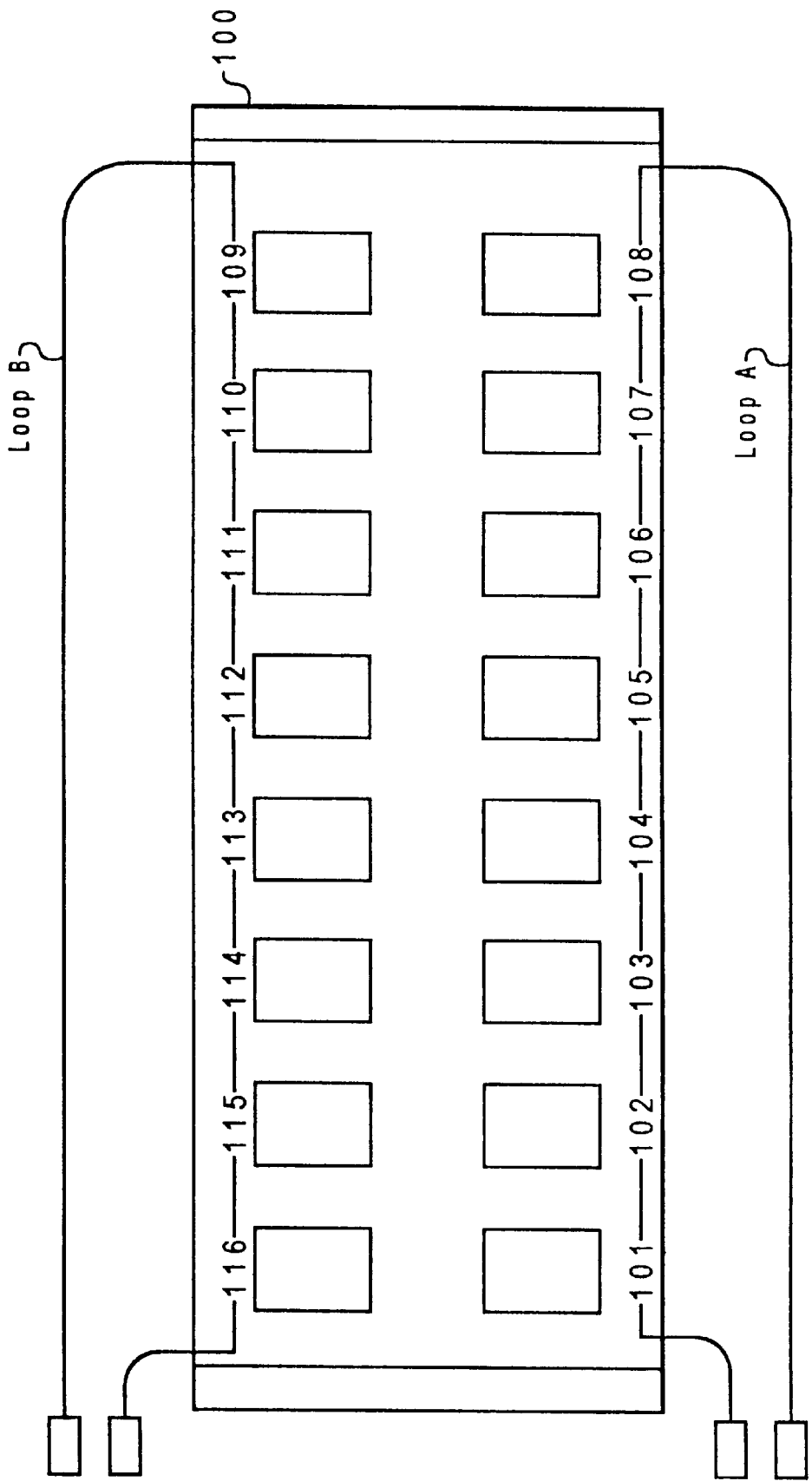
FIG. 1 is a partially schematic pictorial representation of a RAID array disk drawer which will be utilized to illustrate the method and process of an illustrative embodiment the present invention.

With reference now to the figures and in particular with reference to FIG. 1, there is depicted a partially schematic pictorial representation of a RAID array disk drawer which will be utilized to illustrate the method and process of an illustrative embodiment of the present invention. Shown in FIG. 1 is a RAID array disk drawer 100. Depicted are disk drive slots 101, 102, 103, 104, 105, 106, 107, 108, 109, 110, 111, 112, 113, 114, 115, and 116. The disk drive slots are actual physical locations within the drawer containing the appropriate hardware for installation of disk storage devices into those slots. Also shown in FIG. 1, are two loops (two loops are shown for the sake of illustration, but it will be understood by those within the art that more or less than two loops could be utilized) A and B, which are connected to a RAID adapter (not shown) which allows a computing system's I/O port to effectively utilize the redundance of the RAID system in a manner well known to those within the art. The loops A and B are connected with the hardware of the disks slots such that the relative electrical positions of the disks on the loop can be determined, again by a mechanism well known by those within the art.

Figure 2:
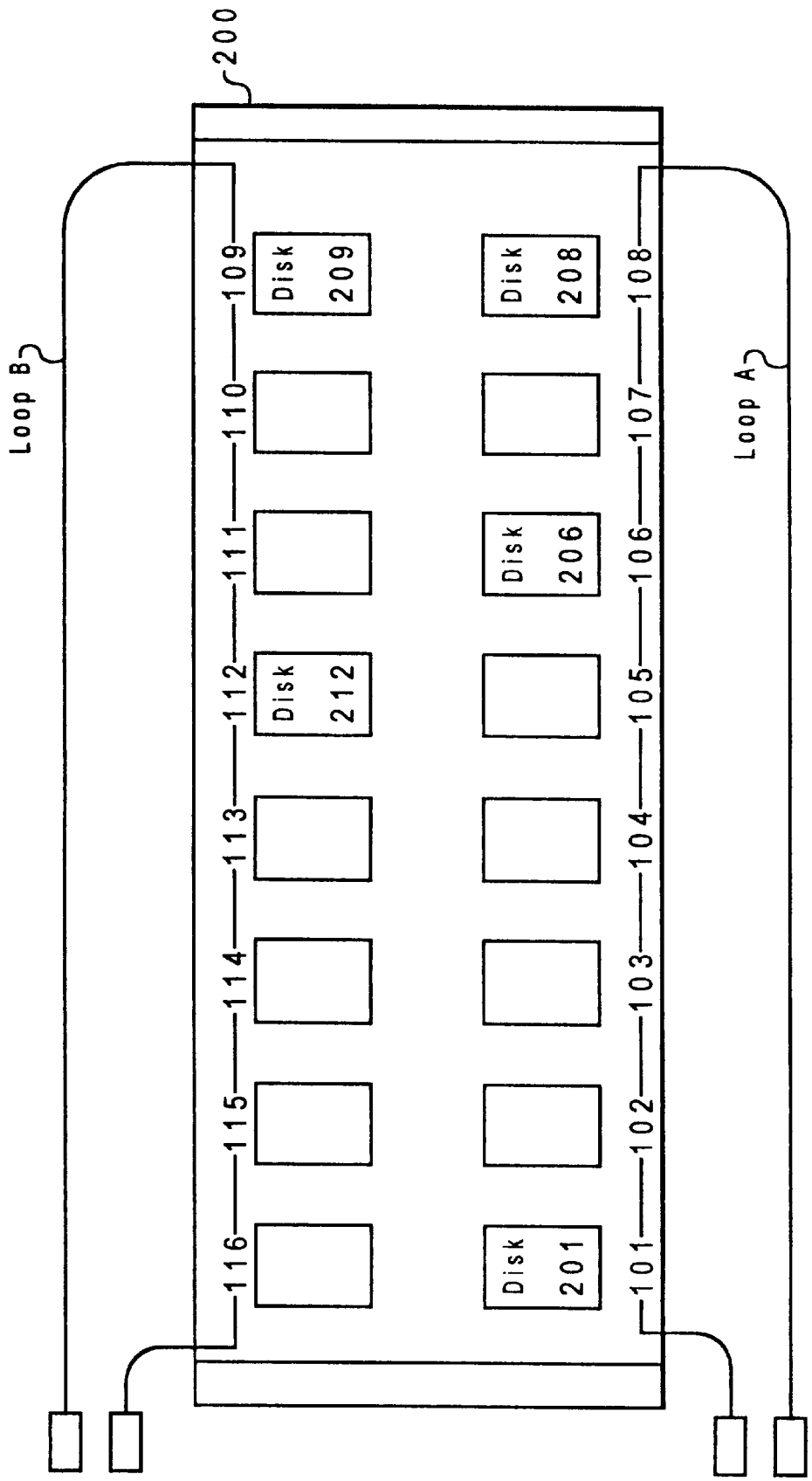
FIG. 2 is a prtially schematic pictorial representation of,a RAID array disk drawer similar to that depicted in FIG. 1 but with disk storage devices 201, 206, 208, 209, and 212 installed within disk drive slots 101, 106, 108, 109, and 112.

Refer now to FIG. 2, where there is depicted a partially schematic pictorial representation of a RAID array disk drawer 200 similar to that depicted in FIG. 1, but with disk storage devices 201, 206, 208, 209, and 212 installed within disk drive slots 101, 106, 108, 109, and 112. Also shown in FIG. 2, are loops A and B similar to those depicted in FIG. 1. Notice that electrically it will be possible to determine the relative position of the disk storage devices on loops A and B, but that this relative electrical position will not be indicative of the actual physical position. That is, electrically, it can be determined that disk storage device 201 precedes disk storage device 206, and that disk storage device 206 precedes disk storage device 208 on loop A, and that disk storage device 209 precedes disk storage device 212 on loop B. However, this relative electrical position does not yield the physical information that disk storage device 201 is installed in disk drive slot 101, nor that disk storage device 206 is installed in disk drive slot 106, nor that disk storage device 208 is installed in disk drive slot 108. Neither does it yield the fact that disk storage device 209 is installed in disk drive slot 109, nor the fact that disk storage device 212 is installed in disk drive slot 112.

Figure 3:
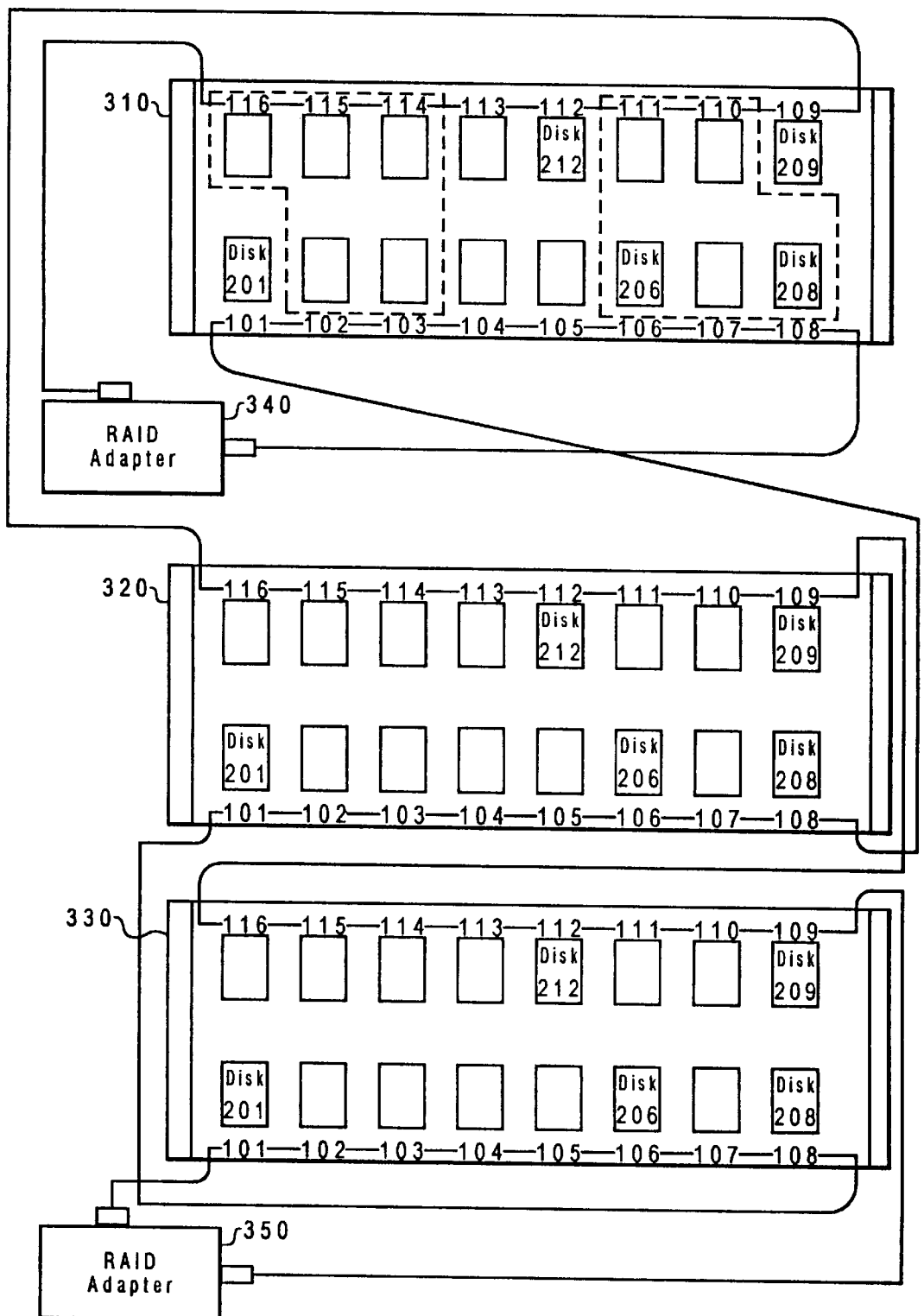
FIG. 3 depicts three partially schematic pictorial representations of RAID array disk drawers similar to those depicted in FIG. 2.

Refer now to FIG. 3, where there are depicted three partially schematic pictorial representation of RAID array disk drawers 310, 320, and 330 similar to those depicted in FIG. 2 in that each such RAID array disk drawer shown has similar disk storage devices 201, 206, 208, 209, and 212 installed within disk drive slots 101, 106, 108, 109, and 112. Also shown in FIG. 3 are loops A and B, similar to those depicted in FIGS. 1 and 2, but which are electrically connected to be continuous across the three RAID array disk drawers 310, 320 and 330. Loops A and B are shown connected to RAID adapters 340 and 350, which allow a computing systems' I/O port to effectively utilize the redundance of the RAID system in a manner well known to those in the art. Insofar as the fact that the drawers are relatively positioned (in the vertical position) as shown in FIG. 3, there is at present no way to electrically determine that fact. Thus, in the situation shown in FIG. 3 the location problem noted in FIG. 2 is compounded in that although it is possible to determine electrically the electrical locations of the disks on loops A and B, it is not possible to determine where the disks are physically located. That is, while in FIG. 2 it was demonstrated that one cannot determine the physical location of disk storage devices in one drawer, in FIG. 3 it is shown that not only the relative physical positions of disks on a loop within a drawer are indiscernible, but, in addition, relative physical positions of disks in different drawers are indiscernible. Once again, as was demonstrated in FIG. 2, the only information that can be gleaned related to the disks on loops A and B is the relative electrical positions of the loops.

It will be understood by those within the art that it is vitally important that the physical positions of the disk storage devices within the drawers be known so that the disks can be properly configured to perform adequately with the RAID system being utilized. Previous to the present invention, much work was needed to manually configure such disks. The method and system of an illustrative embodiment of the present invention makes it possible to determine the physical positions of disks within the RAID array disk drawers automatically. An illustrative embodiment of the present invention does this by specifying a specific protocol for the manner in which groups of disks making up arrays are added to the RAID array disk drawers.

Figure 4:
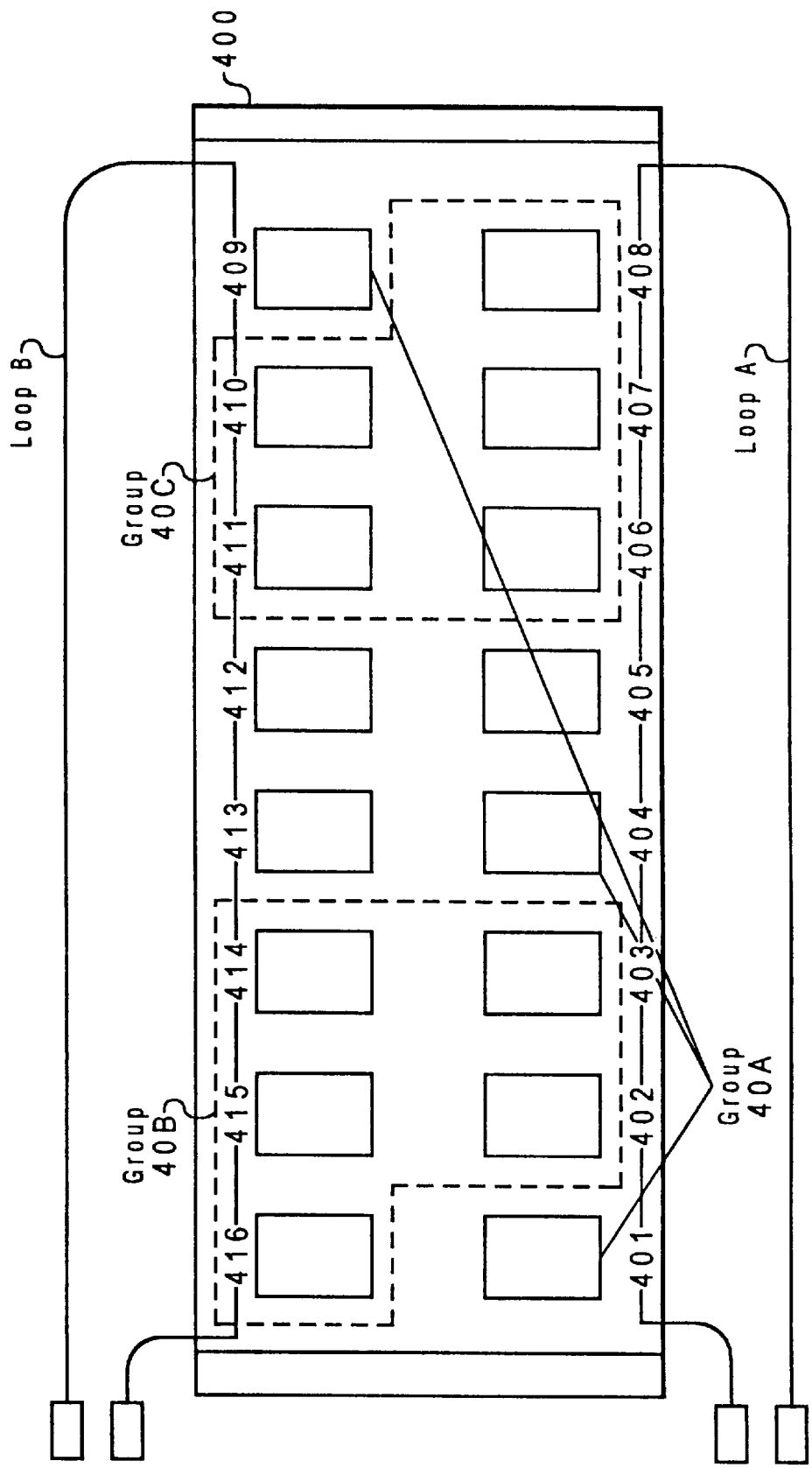
FIG. 4 is a partially schematic diagram showing the appropriate protocol for adding arrays of disks to RAID array disk drawers when utilized with a RAID system using 4 data disks and 1 parity disk in each array.

Refer now to FIG. 4, which is a partially schematic diagram showing the appropriate protocol for adding arrays of disks to RAID array disk drawers when utilized with a RAID system using 4 data disks and 1 parity disk in each array. Shown is a RAID array disk drawer 400. The rules for adding SSA disks in an illustrative embodiment depicted in FIG. 4 are as follows. Disks must be added to drawers in groups of five corresponding to the positions of groups 40A, 40B, and 40C. Group 40A (disk slots 404, 405, 412, 413, and 409) must be the first added, and when group 40A is added hot spare disk 401 is added in the position shown in FIG. 4. Subsequent to group 40A being populated, group 40B (disk slots 402, 403, 414, 415, and 416) must be populated. Subsequent to group 40B being populated, group 40C (406, 407, 408, 410, and 411) must be populated. Groups must be added to only one existing drawer (that is, no more than one partially populated drawer is to exist in the system at any one time.) Subsequent to a drawer being completely filled, one or more full drawers can be added, but only one partially populated new drawer can be added. Subsequently, the protocol for adding additional groups of disks to the partially populated drawers, and additional drawers, are the foregoing described rules which were described in relation to adding groups 40A, 40B, and 40C to RAID array disk drawer 400. The sequence of adding drawers and groups of disks as described can then proceed ad infinitum. After adding new disks according to the foregoing rules, software configuration must be run to create 4+P RAID-5 Arrays from the new disks.

In order to add disks to more than one existing drawer or to add more than one new partially populated drawer, the disks must be added in multiple phases employing the rules listed in relation to FIG. 4.

Assuming the rules set forth in relation to FIG. 4 are followed, the configuration of new disks added can be determined by counting the number of disks added to each loop. Generally, an even multiple of 8 disks on a loop indicates that a full drawer was added so only the count modulo 8 is needed. In circumstances where different configurations have the same modulo count, it is necessary to check whether new disks were added between existing member disks. The position of the hot spare disk and one of the group A disks facilitates detection of when either or both group B and group C have been added to an existing drawer.

Figure 5:
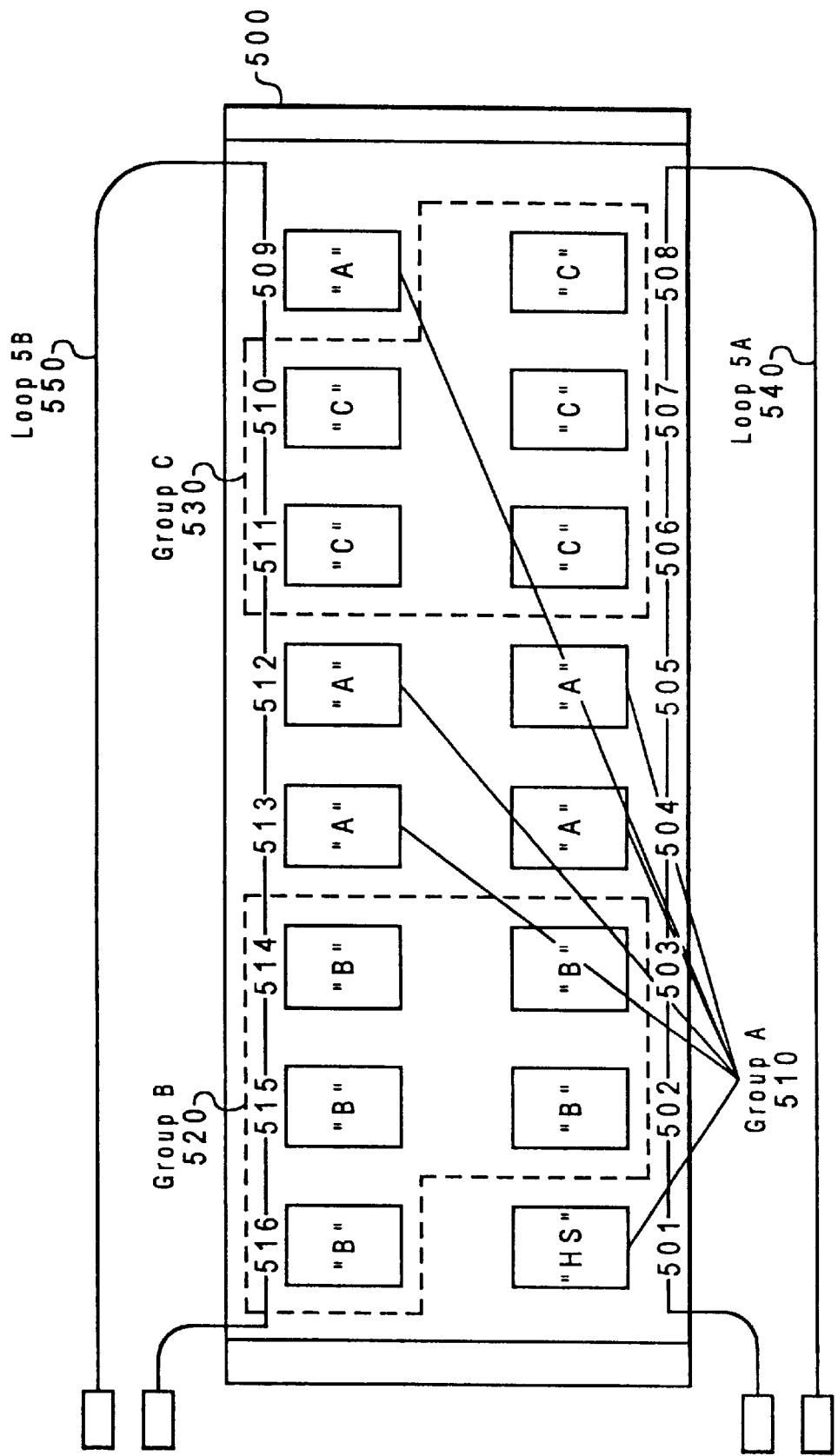
FIG. 5 is a partially schematic diagram showing defined generic groups A, B, and C, as well as hot spare positions that are utilized by an illustrative embodiment of the present invention.

Refer now to FIG. 5, which is a partially schematic diagram showing defined generic groups A, B, and C, as well as hot spare positions that are utilized by an illustrative embodiment of the present invention. Shown is a RAID array disk drawer 500. Also shown are the disk drawer locations for group A 510, which are denoted by the disk slots "A" and the grouping of which are denoted by the lines connecting disk slots 504, 505, 509, 513, 512, plus hot spare position 501 to "Group A 510." Shown also are the disk drawer locations for group B 520 which are denoted by the disk slots "B" and the grouping of which are denoted by the dotted line encircling disk slots "B." Shown also are disk drawer locations for C group 530 which are denoted by the disk slots "C" and the grouping of which are denoted by the dotted line encircling disk slots "C." Also note that two loops, loop 5A 540 and 5B 550 are shown. Note that generic groups A, B, and C and generic loops 5A, and 5B correspond to the groups 40A, 40B, and 40C, and loops A and B as were discussed above in relation to FIG. 4.

Refer now to FIG. 6, which is an illustration of the logic involved with respect to how the physical location of disks within a RAID system are determined in an illustrative embodiment of the present invention. A necessary assumption of FIG. 6 is that the rules for adding disk storage devices and RAID array disk drawers as set forth in FIG. 4 have been precisely followed. FIG. 6 demonstrates how the asymmetrical groupings (i.e., group B 520 and group C 530) illustrated in FIG. 5 make it possible to determine with certainty what groups have been added to an existing drawer and what groups are present in any newly added partially populated drawer. Shown in FIG. 6 are representations of how two loops would register electrically in a partially populated RAID array disk drawer.

In FIG. 6, the letters "A," "B," "C," "H," in the table indicate the addition of new disks in the group positions A, B, C, or in the hot spare position H. The letter "M" indicates existing array members or hot spares. The word "any" indicates that any valid grouping applies. A blank "_" indicates an empty location. Note that any number of full drawers may appear between existing drawers and any new partially populate drawer.

Shown in FIG. 6 are columns with the following headings: Pre-Existing (that is, prior to the addition of new disks and/or new drawers) Disk Drawer Contents, New Partial Disk Drawer Contents, Pre-Existing Number of Disks on Loop A and Loop B, Number of Disks on Loop A and Loop B, After Addition of New Disks, Additional Disks on Loop A and Loop B, Modulo 8 Count on New Disks Added on Loop A and Loop B, and New Disks Added Between Disk Previously on Loop A and Loop B. Pre-Existing Disk Drawer Contents shows two things: the population of a disk drawer prior to the addition of new disks (shown in FIG. 6 by the letter "M"), and the population of a disk drawer subsequent to the addition of new disks (shown in FIG. 6 by the letters "A," "B," "C," of "H".) Thus, in Row 5 of FIG. 6, Pre-Existing Disk Drawer Contents shows the contents of a disk drawer, that, prior to the addition of new disks, was partially populated in the positions denoted by the letter "M;" also shown in Row 5 of FIG. 6 are the contents of the disk drawer after the addition of new disks denoted by the letter "B" (corresponding to group B, as described above in relation to FIG. 5.). Notice that there are two loops depicted in the rows of FIG. 6 which denote that each row records the contents of a partially populated drawer as recorded on a particular loop (shown in FIG. 5 as loop 5A 540 and loop 5B 550) in a drawer.

New Partial Disk Drawer Contents shows the population of any partially populated disk drawer that was added in addition to any disks shown added to the contents of a pre-existing disk drawer (where, again, the letters "A," "B," "C," and "H" are utilized to show that such disks have been added subsequent to the disks denoted as "M" which were in the pre-existing disk drawer contents prior to the addition of any disks). Number of Disks on Loop A and Loop B After Addition of New Disks are those contents of a partially populated drawer as recorded on a particular loop (shown in FIG. 5 as loops 5A 540 and 5B 550) subsequent to any addition of disks. Additional Disks on Loop A and Loop B are the number of new disks that have appeared on Loop A and Loop B subsequent to those disks denoted as "M" in each row. Modulo 8 Count of New Disks Added on Loop A and Loop B is the remainder number of the new disks as recorded on a particular loop (shown in FIG. 5 as loops 5A 540 and 5B 550) when divided by eight. New Disks Added Between Disks Previously on Loop A and Loop B is that number of disks that have been added in between disks that were on a loop prior (that is, those disks denoted by the letter "M") to the addition of new disks.

The information shown in FIG. 6 is utilized to determine the physical location of disks within disk drawers on the basis of the sensing of the electrical relative positioning of disks, provided that the rules for adding new disks and drawers as set forth above in relation to FIG. 4 are followed precisely. For example, in relation to Row 5 of FIG. 6, prior to the addition of any new disks electrical sensing will determine the electrical location of disks denoted as "M," which, assuming the rules for adding drawers and disks have been precisely followed, will equate to certain physical locations of the disks. With this information in hand, electrical sensing can be utilized to determine the values of Pre-Existing Number of Disks on Loop A and Loop B, Number of Disks on Loop A and Loop B, After Addition of New Disks, Additional Disks on Loop A and Loop B, Modulo 8 Count on New Disks Added on Loop A and Loop B, and New Disks Added Between Disks Previously on Loop A and Loop B.

With the knowledge of the initial positioning of the disks shown by "M," electrical sensing is then utilized to determine the values shown in columns Pre-Existing Number of Disks on Loop A and Loop B, Number of Disks on Loop A and Loop B After Addition of New Disks, Additional Disks on Loop A and Loop B, Modulo 8 Count on New Disks Added on Loop A and Loop B, New Disks Added Between Disks Previously on Loop A and Loop B. Subsequently, the remaining information in FIG. 6 is utilized to conclude that the disks denoted by the letters "A," "B," or "C" have been added to a pre-existing disk drawer and/or a newly added partially populated disk drawer. That is, the values shown in FIG. 6 provide a way in which the electrical relative positioning of disk can be automatically equated with the physical positioning of the disks within pre-existing or partially populated disk drawers.

As an example of how the information in FIG. 6 is utilized, with respect to Row 5 of FIG. 6, column Pre-Existing Disk Drawer Contents shows that prior to the addition of new disks to a certain pre-existing disk drawer (i.e., prior to the addition of disks denoted in Row 5 of FIG. 6 by the letters "B" and "A") electrical sensing was utilized to determine that on Loop B of that drawer 3 disks were present in the positions denoted by the three "M" disks on Loop B, and that on Loop A of that drawer three disks were present in the positions denoted by the three "M" disks on loop A. These electrically sensed values are utilized to determine the values shown Row 5 of FIG. 6, column Pre-Existing Number of Disks on Loop A and Loop B.

Subsequently, new disks are added. On the basis of electrical sensing, it is determined that column Number of Disks on Loop A and Loop B After Addition of New Disks should have the values of 9 for Loop B and 8 for Loop A, as is shown in Row 5 of FIG. 6. On the basis of these electrically sensed quantities in conjunction with column Pre-Existing Number of Disks on Loop A and Loop B which have the values of 3 for Loop B and 3 for Loop A, as is shown in Row 5 of FIG. 6, it is calculated that column Additional Disks on Loop A and Loop B will have the values of 6 for Loop B and 5 for Loop 8, as is shown in Row 5 of FIG. 6.

The calculated values for column Additional Disks on Loop A and Loop B (values of 6 for Loop B and 5 for Loop 8), are then utilized to calculate column Modulo 8 Count of New Disks Added on Loop A and Loop B, which will have the values of 6 for Loop B and 5 for Loop A, as is shown in Row 5 of FIG. 6.

The previously determined location of disks denoted by "M" in Row 5 of FIG. 6 are then utilized in conjunction with electrical sensing to determine the number of New Disks Added Between Disks Previously on Loop A and Loop B, which will have the value of 0 for Loop B and 2 for Loop A, as is shown in Row 5 of FIG. 6.

Utilizing the previously electrically sensed and calculated information as shown in columns Pre-Existing Disk Drawer Contents, Modulo 8 Count on New Disks Added on Loop A and Loop B, New Disks Added Between Disks Previously on Loop A and Loop B of Row 5 of FIG. 6, it can then be concluded that new disks denoted by the letters "A," "B," and "C" have been added to the pre-existing disk drawer, as is shown in column Pre-Existing Disk Drawer Contents of Row 5 of FIG. 6; furthermore, it can also be concluded that a partially populated disk drawer has also been added with the contents denoted by letters "A," and "H," as is shown in New Partial Disk Drawer Contents of Row 5 of FIG. 6.

Thus, FIG. 6 allows the physical location of newly added disks on the basis of the disks electrically sensed relative positions.

Also shown in FIG. 6 in addition to discussed Row 5 are Rows 1–4 and 6–11. The utilization of these rows follow substantially the same logical sequence as just described for Row 5 of FIG. 6.

Table 6 shows the sequence of events up to the adding of four RAID groups of type 4+P. Adding of 5 or more 4+P groups just repeats the above with additional full drawers. That is, provided that the rules for adding disk drawers and additional drawers are correctly followed, adding 5 or more 4+P groups will equate to adding a certain number of full disk drawers. Since a full disk drawer will have a modulo 8 count of 0 (that is, since a full drawer has sixteen disks) the full drawers will essentially be transparent to the salient (i.e., Pre-Existing Disk Drawer Contents, Modulo 8 Count on New Disks Added on Loop A and Loop B, New Disks Added Between Disks Previously on Loop A and Loop B) information shown in FIG. 6 which is utilized to determine the location of groups added either to pre-existing disk drawers or to newly added partially populated disk drawers. The high-level logic flowchart of FIG. 7 will demonstrate exactly how this is done.

Figure 7A:
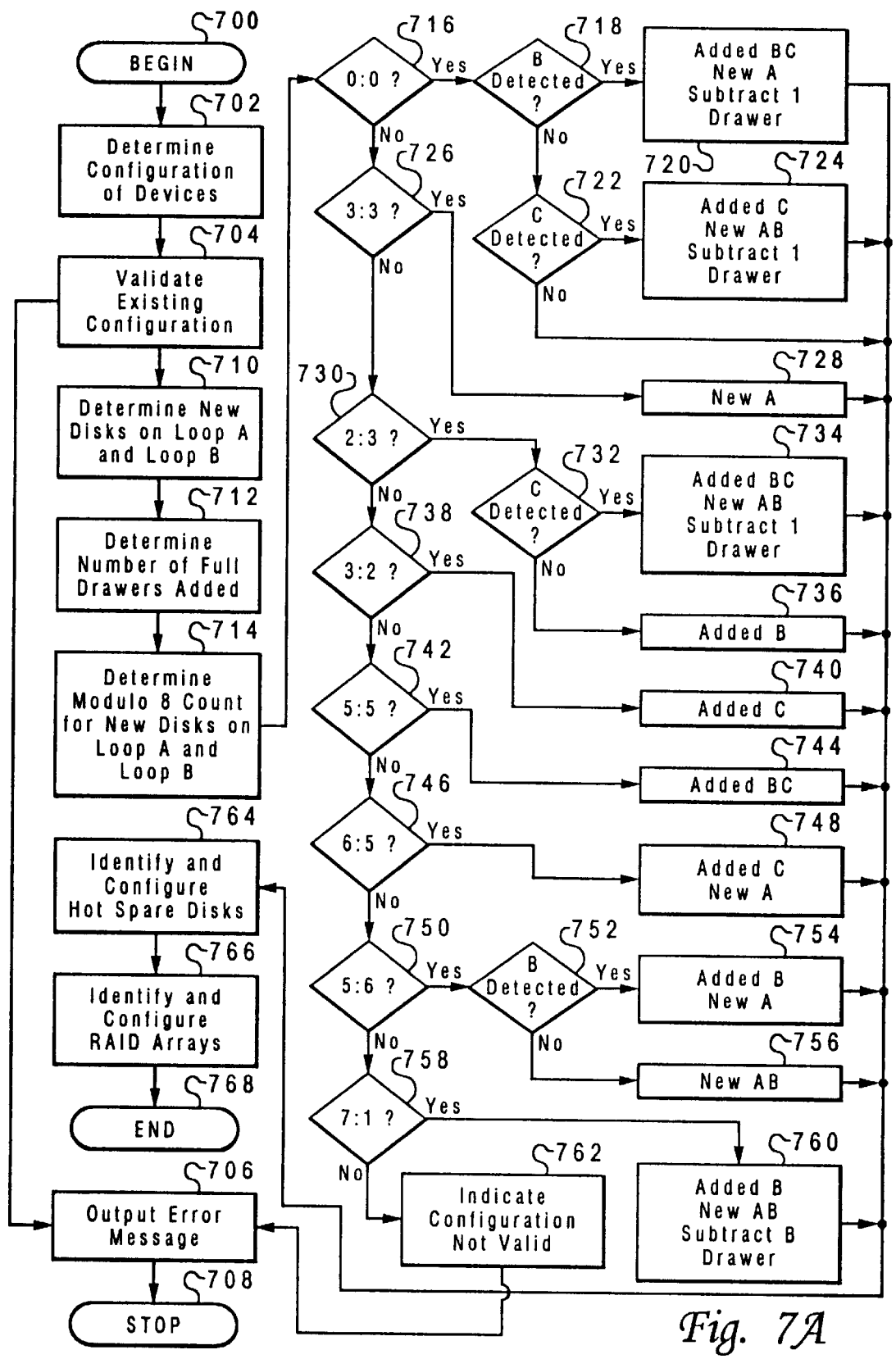
FIG. 7A a high-level logic flowchart depicting the method and process of an illustrative embodiment of the present invention.

Refer now to FIG. 7A, which is a high-level logic flowchart depicting the method and process of an illustrative embodiment of the present invention. Method step 700 depicts the start of the process. Method step 702 illustrates the determination of the electrical configuration of devices on loops A and B, as has been discussed above in reference to FIGS. 1–4. Method step 704 shows that the configuration of devices as read in method step 702 is examined for "validity." That is, if the rules for adding RAID array disk drawers and additional groups of disks as described above in relation to FIG. 4 are followed precisely, only a certain finite number of valid disk configurations are possible; consequently, method step 704 illustrates that the configuration of disks read in method step 702 fits one of the "valid" configurations. If an invalid configuration is detected, then the process proceeds to method step 706 wherein an error message is output and the process subsequently stops at method step 708. If no invalid configuration is detected, the process proceeds to method step 710.

Figure 8:
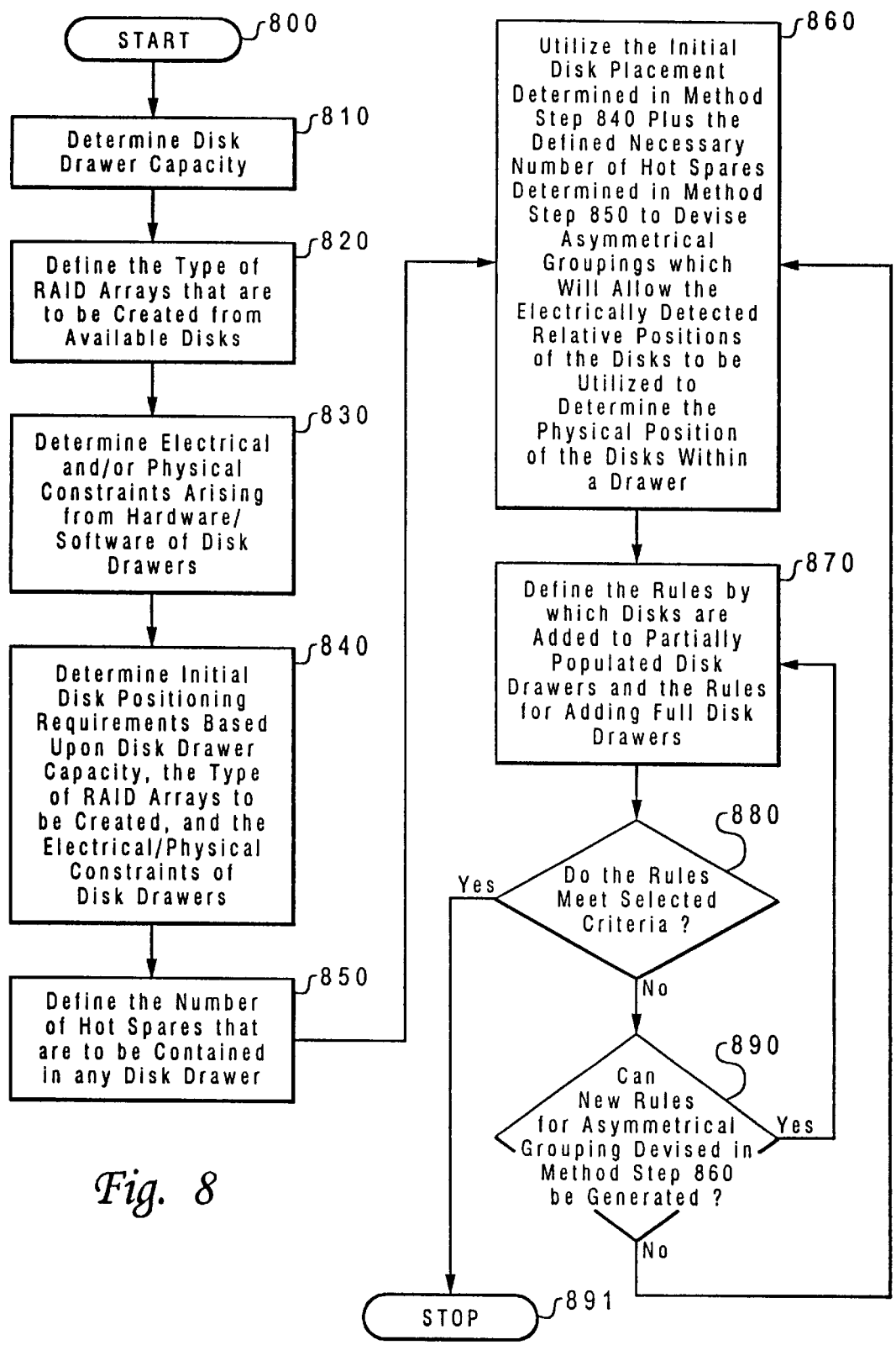
FIG. 8 is a, high level logic flowchart of the method and process of the present invention.

Method step 710 step shows the determination of how many new disks have been added on loop A and loop B (the details of how this is done are shown in FIG. 8, below.) Method step 712 depicts utilizing the determination of how many disks have been added on loops A and B to determine how many full drawers have been added. Method step 712 accomplishes this by dividing the number of new disks, as was determined in method step 710, by 8. The dividend of this operation is, thus the number of full drawers added on each loop (since each full drawer on each loop will have eight disks); thus, the smallest dividend obtained by dividing the number of disks appearing on loop A and loop B will be that number of additional drawers with new disks. The remainder of the operations of dividing the number of new disks on loop A and loop B by 8 can be referred to as the modulo 8 count of the new disks added on loop A and loop B. Method step 714 shows that the modulo 8 count (remainder) for the new disks on both loop A and loop B is determined.

The remainder of the high-level logic flowchart now utilizes the modulo 8 count of the new disks added to loop A and loop B to determine the groups that have been added to the array as it was previous to the present process being engaged in (that is, previous to the current iteration of the process.) The number appearing to the left of the decision boxes shown down the center of the page denote the modulo 8 count for the new disks on loop A and the number appearing to the right of the colon denote the modulo 8 count for the new disks on loop B.

Method step 716–724 form a logical unit and depicts a determination as to whether the determination of the number of full drawers added in method step 712 could have possibly been in error. That is, even though loop A and loop B both had modulo 8 counts equal to zero, when the rules for adding disks and drawers are followed there are configurations which will yield modulo 8 equal to zero counts on loop A and B, and yet arise from a drawer which is partially populated. The logical unit formed by method steps 716–724 checks for this eventuality. In the event that both loop A and loop B had modulo 8 counts equal to zero the process proceeds to method step 718 wherein it is determined whether the addition of a group B (via the rules set forth in FIG. 6, above) has been detected. If such is the case the process proceeds to method step 720 wherein it is determined that a BC group has been added to a pre-existing partially populated drawer making such drawer fully populated and that a new drawer, partially populated with group A, has been added; furthermore, the number of new fully populated drawers added (determined in method step 712, above) is determined to be incorrect and is thus decremented by one, which brings the count of the newly added fully populated drawers to the correct number. In the event that it is determined in method step 718 that no group B can be detected, then the process proceeds to method step 722 wherein it is determined whether the addition of a group C (via the rules set forth in FIG. 6, above) has been detected. If such is the case the process proceeds to method step 724 wherein it is determined that a C group has been added to a pre-existing partially populated drawer making such drawer fully populated and that a new drawer, partially populated with groups A and B, has been added; furthermore, the number of new fully populated drawers added (determined in method step 712, above) is determined to be incorrect and is thus decremented by one, which brings the count of the newly added fully populated drawers to the correct number. Subsequent to the process engaging in method steps 716–724, the process proceeds to method step 764.

Method steps 726–728 form another logical unit and depicts the determination of disk configuration when both loop A and loop B have modulo 8 counts equal to three. Method steps 726–728 show that a modulo 8 count on both loop A and loop B indicate that a new drawer partially populated with an A group has been added. Subsequent to the process engaging in method steps 726–728, the process proceeds to method step 764.

Method steps 730–736 form another logical unit and depicts the determination of disk configuration when loop A has modulo 8 count equal to two and loop B has modulo 8 count equal to three. In such a case the process proceeds to method step 732 and determines whether the addition of a group C (via the rules set forth in FIG. 6, above) has been detected. If such is the case the process proceeds to method step 734 wherein it is determined that a BC group has been added to a preexisting partially populated drawer making such drawer fully populated and that a new drawer, partially populated with group A and group B, has been added; furthermore, the number of new fully populated drawers added (determined in method step 712, above) is determined to be incorrect and is thus decremented by one, which brings the count of the newly added fully populated drawers to the correct number. In the event that it is determined in method step 732 that no group C can be detected, then the process proceeds to method step 736 wherein it is determined that a B group has been added. Subsequent to the process engaging in method steps 730–736, the process proceeds to method step 764.

Method steps 738–740 form another logical unit and depicts the determination of disk configuration when loop A has modulo 8 count equal to three and loop B has modulo 8 count equal to two. Method steps 738–740 show that a modulo 8 count on loop A equal to three and a modulo 8 count on loop B equal to two indicate that a C group has been added to a pre-existing partially populated drawer. Subsequent to the process engaging in method steps 738–740, the process proceeds to method step 764.

Method steps 742–744 form another logical unit and depicts the determination of disk configuration when loop A has modulo 8 count equal to five and loop B has modulo 8 count equal to five. Method steps 742–744 show that a modulo 8 count on loop A equal to five and a modulo 8 count on loop B equal to five indicate that a both a B group and a C group has been added to a pre-existing partially populated drawer. Subsequent to the process engaging in method steps 742–744, the process proceeds to method step 764.

Method steps 746–748 form another logical unit and depicts the determination of disk configuration when loop A has modulo 8 count equal to six and loop B has modulo 8 count equal to five. Method steps 746–748 show that a modulo 8 count on loop A equal to six and a modulo 8 count on loop B equal to five indicate that a both a C group has been added to a pre-existing partially populated drawer and that a new drawer, partially populated with an A group, has been added. Subsequent to the process engaging in method steps 746–748, the process proceeds to method step 764.

Method steps 750–756 form another logical unit and depicts the determination of disk configuration when loop A has modulo 8 count equal to five and loop B has modulo 8 count equal to 6. In such a case the process proceeds to method step 752 and determines whether the addition of a group B (via the rules set forth in FIG. 6, above) has been detected. If such is the case, the process proceeds to method step 754 wherein it is determined that a B group has been added to a pre-existing partially populated drawer making such drawer fully populated and that a new drawer, partially populated with group A, has been added; furthermore, the number of new fully populated drawers added. In the event that it is determined in method step 752 that no group B can be detected, then the process proceeds to method step 756, wherein it is determined that a new drawer partially populated with group A and group B has been added. Subsequent to the process engaging in method steps 750–756, the process proceeds to method step 764.

Method steps 758–760 form another logical unit and depicts the determination of disk configuration when loop A has modulo 8 count equal to seven and loop B has modulo 8 count equal to one. Method steps 758–760 show that a modulo 8 count on loop A equal to seven and a modulo 8 count on loop B equal to one indicate that a group B has been added to a pre-existing partially populated drawer and that a new drawer, partially populated with group A and group B, has been added. Subsequent to the process engaging in method steps 758–760, the process proceeds to method step 764.

Method step 762 is reached if none of the possible modulo counts exist within the disk drawers. Method step 762 indicates that in the event that none of the possible modulo counts was detected, then it is known that the configuration in the disk drawers is not valid (i.e., the rules for adding disks and drawers as set forth above in FIG. 4 have not been properly followed). Accordingly, method step 762 indicates that the process proceeds to method step 706 wherein an error message indicating invalid configuration is output. Subsequently, the process proceeds to method step 708 and stops.

Method step 764 shows that once the configuration of the groups is known, then it can be determined where the hot spare disks are in each drawer (such knowledge arising out of the rules for adding disks and drawers as set forth above). Consequently, method step 764 shows the identification and configuration of hot spare disks.

At this point, it is known how many fully populated drawers have been added, how many partially populated drawers have been added and which groups (A, B, and/or C) partially populated the added drawers, and the configuration and location of the hot spare disks. Thus, all knowledge necessary to properly configure the RAID arrays is now known. Accordingly, method step 766 depicts the identification and configuration of the disks in the drawers such that such identified and configured disks properly constitute the type of RAID arrays desired.

Subsequently, the process proceeds to method step 768 which depicts the end of the process.

The above discussion focused on a situation wherein the actual physical position of disk storage devices within RAID array disk drawers could not be determined from the detected electrical positions of the disk storage devices. However, it will be understood by those within the art that hardware and software could be added to the RAID array disk drawers sufficient to allow the detected electrical positions within each RAID array disk drawer to equate to physical locations of disk storage devices within such RAID array disk drawers. It will also be understood by those within the art that similar hardware and software could be added to RAID array disk drawers sufficient to sense each RAID array disk drawer's position relative to other RAID array disk drawers. It is to be understood that an illustrative embodiment of the present invention will also be useful with such intelligent RAID array disk drawers in that the present invention will still allow the autoconfiguring of RAID arrays from disk storage devices within such intelligent RAID array disk drawers.

Figure 7B:
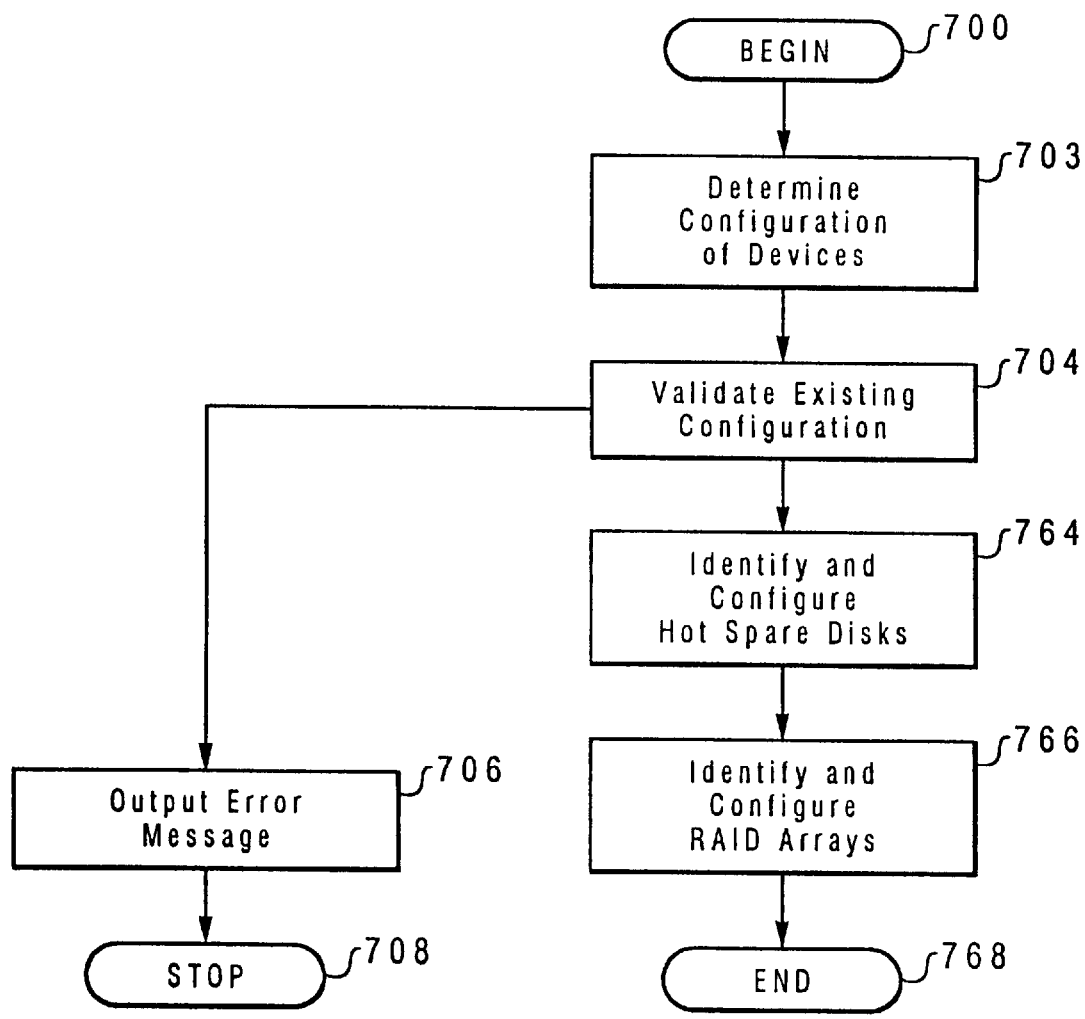
FIG. 7B is a high-level logic flowchart of an illustrative embodiment of the present invention that is to be utilized with intelligent RAID array disk drawers.

Refer now to FIG. 7B, which is a high-level logic flowchart of an illustrative embodiment of the present invention that is to be utilized with intelligent RAID array disk drawers. The primary difference between FIG. 7A and FIG. 7B is that FIG. 7B does not display the logic associated with detecting the physical positions of the disks, because it is assumed in FIG. 7B that the disks are of sufficient intelligence such that the detected electrical positions of the disk storage devices can be equated with the physical positions of the disk storage devices within RAID array disk drawers.

Method step 700 depicts the start of the process. Method step 703 illustrates the determination of the configuration of devices on loops A and B, as has been discussed above in reference to FIGS. 1–4. That is, since it is assumed in this flowchart that the RAID array disk drawers are intelligent, the actual physical positions of the disk storage devices within each RAID array disk drawer, and the positions of each RAID array disk drawer relative to the other RAID array disk drawers that might be present, can be determined by electrically querying each drawer. Method step 704 shows that the configuration of devices as read in method step 703 is examined for "validity." That is, if the rules for adding RAID array disk drawers and additional groups of disks as described above in relation to FIG. 4 are followed precisely, only a certain finite number of valid disk configurations are possible; consequently, method step 704 illustrates that the configuration of disks read in method step 703 fits one of the "valid" configurations. If an invalid configuration is detected, then the process proceeds to method step 706 wherein an error message is output and the process subsequently stops at method step 708. If no invalid configuration is detected, the process proceeds to method step 764.

Method step 764 shows that once the configuration of the groups is known, then it can be determined where the hot spare disks are in each drawer (such knowledge arising out of the rules for adding disks and drawers as set forth above). Consequently, method step 764 shows the identification and configuration of hot spare disks.

At this point, it is known how many fully populated drawers have been added, how many partially populated drawers have been added and which groups (A, B, and/or C) partially populated the added drawers, and the configuration and location of the hot spare disks. Thus, all knowledge necessary to properly configure the RAID arrays is now known. Accordingly, method step 766 depicts the identification and configuration of the disks in the drawers such that such identified and configured disks properly constitute the type of RAID arrays desired. Subsequently, the process proceeds to method step 768 which depicts the end of the process.

Refer now to FIG. 8, which is a high-level logic flowchart of the method and process of the present invention. Method step 800 shows the start of the process. Method step 810 depicts the determination of the disk drawer capacity (e.g., how many disks each disk drawer can accommodate, which was 16 in the above-referenced illustrative embodiment). Method step 820 illustrates the determination of type of RAID arrays are to be created from available disks. Method step 830 shows the determination of any electrical or physical constraints that may arise from the hardware or software of the disk drawers (e.g., in the IBM 7133 drawers the electrical constraints are that the hardware and software utilized require that at least one disk be present in each quadrant of the 16 disk drawer and that there not be more than three adjacent slots between disks on a loop.)

Method step 840 shows utilizing the information garnered in method steps 810, 820, and 830 to choose initial disk positioning requirements; that is, choose the initial positioning of one set of disks within the drawers where such set is of number sufficient to construct the type of RAID array desired and such that the electrical and physical requirements are met.

Method step 850 depicts the definition of the number hot spares that are to be contained within each disk drawer. The number of hot spares necessary will be a function of how much tolerance for disk failure the RAID arrays in use and the type of data being handled by the RAID arrays, and can be defined in a manner well known by those within the art.

Method step 860 depicts utilizing the initial disk placement determined in method step 840 plus the defined necessary number of hot spares determined in method step 850 to devise asymmetrical groupings which will allow the electrically detected relative positions of the disks to be utilized to determine the physical position of the disks within a drawer. An example of this step was the definition of group B 550 and group C 530 which are utilized in conjunction with the defined group A 510 as was discussed above in relation to FIG. 5. Notice that in FIG. 5 group B 550 and group C 530 are asymmetrical and that such asymmetry allows the conclusion to be drawn that group B 550 has been added when new disks appear between disks 501 and disk 504 on loop 5A 540. Also notice that the asymmetry allows the conclusion to be drawn that group C 530 has been added when new disks appear between disk 509 and disk 512 on loop 5B 550 of FIG. 5.

Method step 870 shows the definition of the rules by which disks are added to partially populated disk drawers and the rules for adding full drawers. Method step 880 shows that these rules are then compared to selected criteria (for example, the number of total rules, the complexity of the steps involved in the rules, the amount of physical labor involved in carrying out the rules, etc.). In the event that the rules do not meet the selected criteria, the process proceeds to method step 890 wherein it is determined if a new set of rules can be generated. In the event that the inquiry of method step 890 yields a determination that new rules can be chosen, the process proceeds to method step 870 wherein a new set of rules is chosen. In the event that it is determined that no new rule can be chosen, the process proceeds to method step 860 wherein another set of asymmetric disk arrangements is chosen.

In the event that method step 890 indicates that the set of rules defined in method step 870 meet the selected criteria then the process proceeds to method step 891 and stops.

Figure 9:
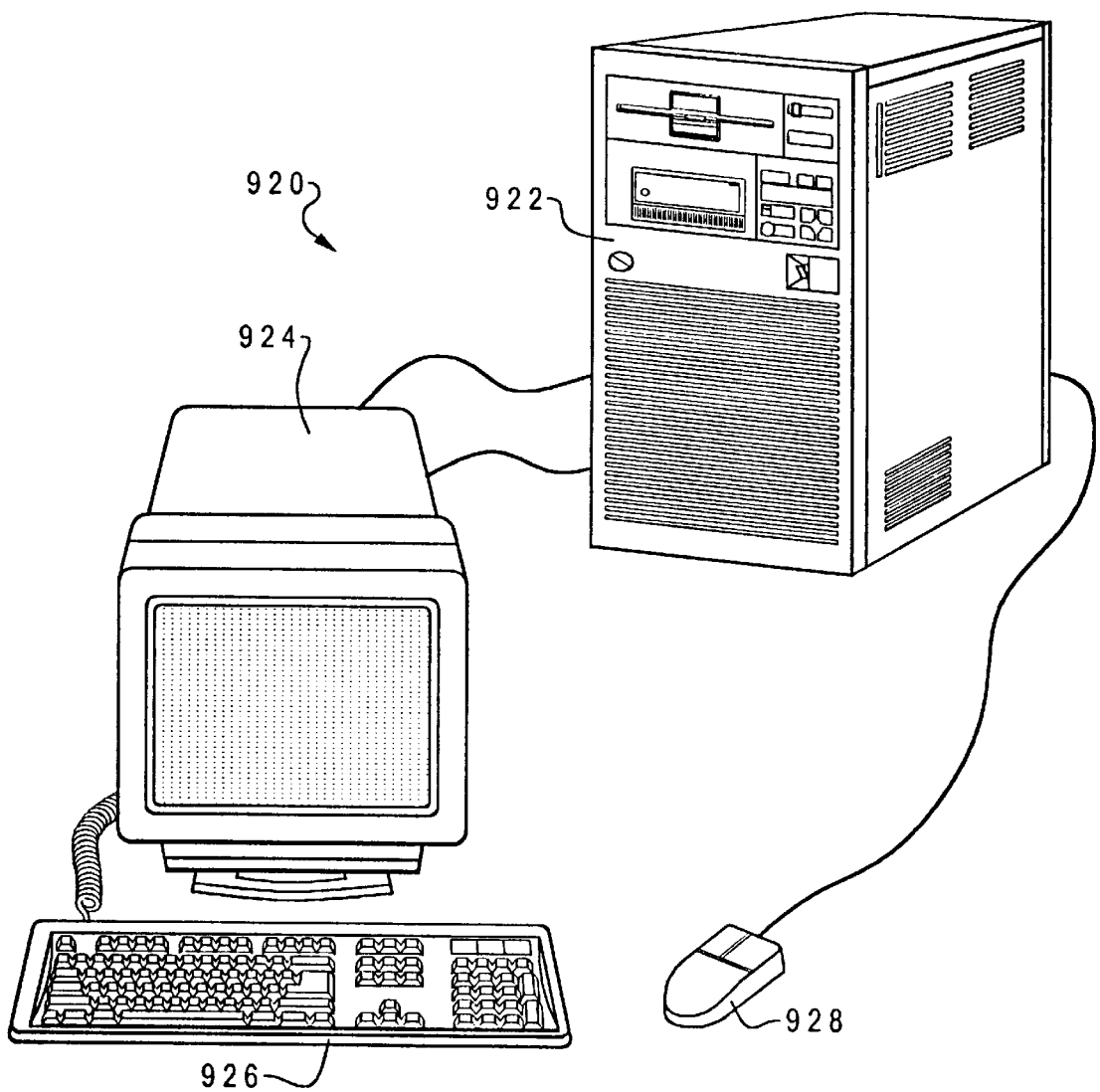
FIG. 9 is a pictorial representation of a data-processing system which can be utilized in accordance with the method and system of an illustrative embodiment of the present invention.

With reference now to the figures and in particular with reference now to FIG. 9, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 9. A computer 920 is depicted which includes a system unit 922, a video display terminal 924, a keyboard 926, and a mouse 928. Computer 920 may be implemented utilizing any suitable computer such as the IBM "RISC System/6000" computer, or the IBM "Aptiva" computer, all products of International Business Machines Corporation, located in Armonk, N.Y. "RISC SYSTEM/6000" and "Aptiva" are trademarks of International Business Machines Corporation.

Figure 10:
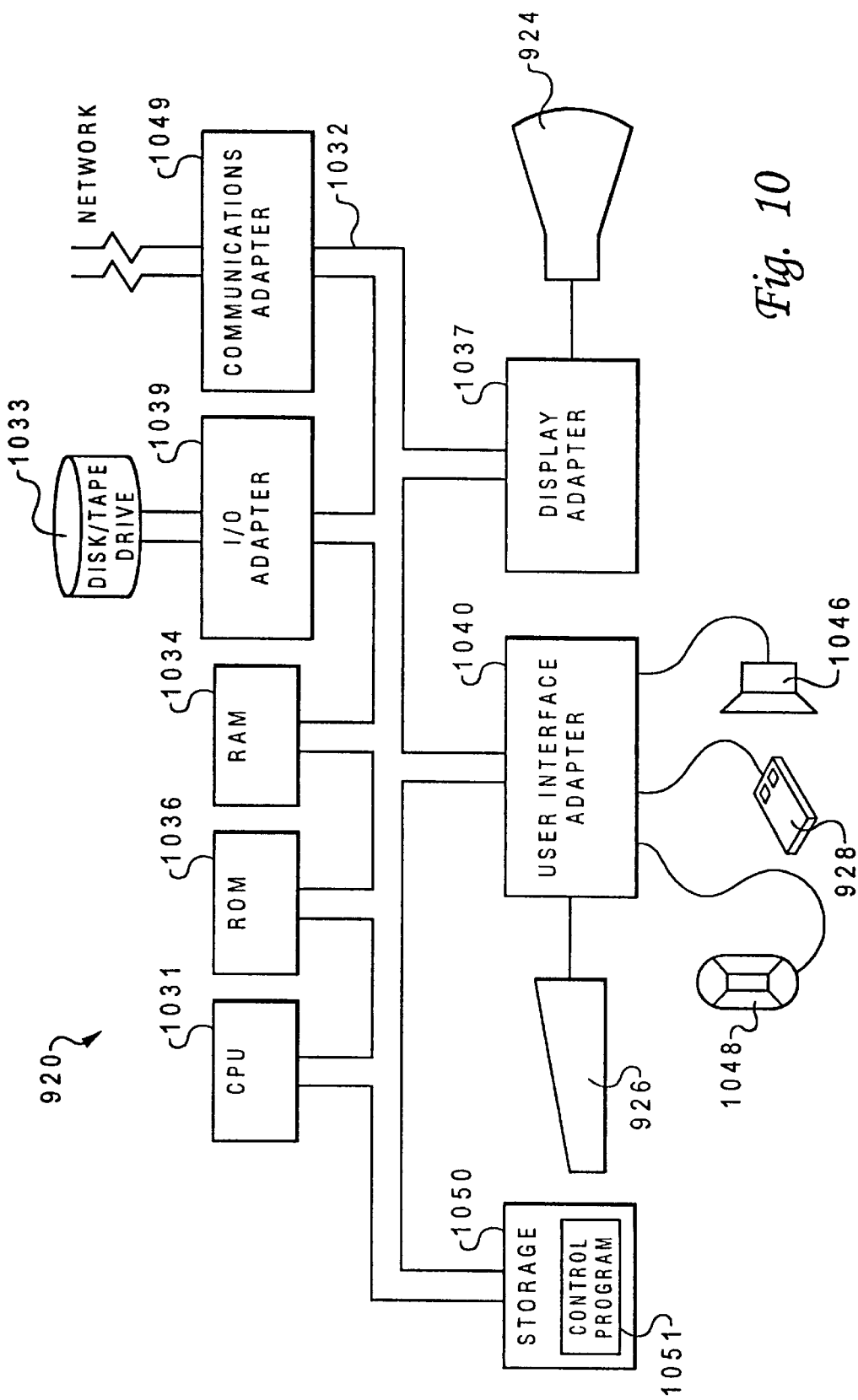
FIG. 10 is an illustration of a representative hardware environment which can be utilized in accordance with the method and system of an illustrative embodiment of the present invention.

FIG. 10 is an illustration of a representative hardware environment which can be utilized in accordance with the method and system of an illustrative embodiment of the present invention. FIG. 10 depicts selected components in computer 920 in which an illustrative embodiment of the present invention may be implemented. System unit 922 includes a Central Processing Unit ("CPU") 1031, such as a conventional microprocessor, and a number of other units interconnected via system bus 1032. Computer 920 includes random-access memory ("RAM") 1034, read-only memory ("ROM") 1036, display adapter 1037 for connecting system bus 1032 to video display terminal 1024, and I/O adapter 1039 for connecting peripheral devices (e.g., disk and tape drives 1033) to system bus 1032. Video display terminal 1024 is the visual output of computer 920, which can be a CRT-based video display, touch screen display, or touch screen add on, which are all well-known in the art of computer hardware. However, with a portable or notebook-based computer, video display terminal 1024 can be replaced with an LCD-based or a gas plasma-based flat-panel display (again with possibly the foregoing noted touch screen options.) Computer 920 further includes user interface adapter 1040 for connecting keyboard 1026, mouse 1028, speaker 1046, microphone 1048, and/or other user interface devices, such as a touch screen device (not shown), to system bus 1032. Communications adapter 1049 connects computer 920 to a data-processing network.

Any suitable machine-readable media may retain the method and system of an illustrative embodiment of the present invention, such as RAM 1034, ROM 1036, a magnetic diskette, magnetic tape, or optical disk (the last three being located in disk and tape drives 1033). Any suitable operating system and associated graphical user interface (e.g., Microsoft Windows) may direct CPU 1031. For example, the AIX operating system and AIXwindows windowing system (i.e., graphical user interface) can direct CPU 1031. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 1031, such as touch-screen technology or human voice control. In addition, computer 920 includes a control program 1051 which resides within computer storage 1050. Control program 1051 contains instructions that when executed on CPU 1031 carries out the all or part of the operations depicted in the logic flowcharts of FIGS. 7, and 8, and the partially schematic diagrams of 1, 2, 3, 4, and 5 as described herein.

Those skilled in the art will appreciate that the hardware depicted in FIG. 10 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media utilized to actually carry out the distribution. Examples of signal bearing media include recordable type media such as floppy disks, hard disk drives, CD ROMs, and transmission type media such as digital and analogue communication links.

While the invention has been particularly shown and described with reference to a preferred embodiment, it will be understood by those skilled in the art that various changes in form and detail may be made therein without departing from the spirit and scope of the invention.

What is claimed is:

1. A method for autoconfiguring redundant arrays of memory storage devices contained within one or more memory storage device receptacles where said receptacles have one or more slots containing hardware sufficient to accept and electrically communicate with said memory storage devices, said method comprising the steps of:

determining said memory storage device receptacle's capacity for accepting said memory storage devices;

defining an initial positioning of one or more memory storage devices in at least one memory storage device receptacle based upon said determined capacity;

defining one or more asymmetrical groupings based upon said determined capacity, and said defined initial positioning, where said defined one or more asymmetrical groupings permit said redundant arrays of memory storage devices to be autoconfigured therefrom; and only adding additional memory storage devices into one or more of said memory storage device receptacles thereafter such that the ability of said defined one or more asymmetrical groupings to permit said redundant arrays to be autoconfigured therefrom is preserved such that redundant arrays of memory storage devices can be autoconfigured from said one or more memory storage devices.

2. The method of claim 1 wherein said step of defining one or more asymmetrical grouping further comprises the step of defining said one or more asymmetrical groupings such that said one or more asymmetrical groupings permit an equation of electrically detected relative positions of said one or more memory storage devices with physical positions of said memory storage devices within a memory storage device receptacle.

3. The method of claim 2 wherein said step of only adding further comprises the step of adding said memory storage devices into said one or more of said memory storage device receptacles such that said ability of said one or more asymmetrical groupings to permit an equation of electrically detected relative positions of said one or more memory storage devices with physical positions of said memory storage devices within a memory storage device receptacle is preserved across said one or more of said memory storage device receptacles.

4. The method of claim 1 further comprising the step of autoconfiguring arrays of memory storage devices utilizing said asymmetrical groupings.

5. The method of claim 1 wherein said step of determining further comprises the step of determining constraints arising from the ability of said memory storage device receptacle's ability to physically accommodate said memory storage devices.

6. The method of claim 1 wherein said step of determining further comprises the step of determining constraints arising from any combination of hardware and software utilized by said memory storage device receptacles.

7. The method of claim 1 wherein said step of determining further comprises the step of determining constraints arising from the ability of said memory storage device receptacle's ability to physically accommodate said memory storage devices and constraints arising from any combination of hardware and software utilized by said memory storage device receptacles.

8. The method of claim 1 wherein said step of determining further comprises the step of defining characteristics of said redundant arrays that are to be autoconfigured from said memory storage devices.

9. The method of claim 8 wherein said step of defining characteristics further comprises the step of defining a number of disks to be utilized within said redundant arrays.

10. The method of claim 9 wherein said step of defining characteristics further comprises the step of defining functions for each of said defined number of disks to be utilized within said redundant arrays.

11. The method of claim 4 wherein said step of autoconfiguring arrays further comprises the steps of:
    determining, on the basis of electrical sensing and said asymmetrical groupings, a number of said memory storage device receptacles and a positioning of one or more of said memory storage devices within said number of said memory storage device receptacles; and
    utilizing said determined positioning of one or more of said memory storage devices within said number of said memory storage device receptacles to autoconfigure said redundant arrays of memory storage device from said one or more memory storage devices within said number of said memory storage device receptacles.

12. An apparatus for autoconfiguring redundant arrays of memory storage devices contained within one or more memory storage device receptacles where said receptacles have one or more slots containing hardware sufficient to accept and electrically communicate with said memory storage devices, said apparatus comprising:
    means for determining said memory storage device receptacle's capacity for accepting said memory storage devices;
    means for defining an initial positioning of one or more memory storage devices in at least one memory storage device receptacle based upon said determined capacity;
    means for defining one or more asymmetrical groupings based upon said determined capacity, and said defined initial positioning, where said defined one or more asymmetrical groupings permit said redundant arrays of memory storage devices to be autoconfigured therefrom; and
    means for only adding additional memory storage devices into one or more of said memory storage device receptacles thereafter such that the ability of said defined one or more asymmetrical groupings to permit said redundant arrays to be autoconfigured therefrom is preserved such that redundant arrays of memory storage devices can be autoconfigured from said one or more memory storage devices.

13. The apparatus of claim 12 wherein said means for defining one or more asymmetrical grouping further comprises means for defining said one or more asymmetrical groupings such that said one or more asymmetrical groupings permit an equation of electrically detected relative positions of said one or more memory storage devices with physical positions of said memory storage devices within a memory storage device receptacle.

14. The apparatus of claim 13 wherein said means for only adding further comprises means for adding said memory storage devices into said one or more of said memory storage device receptacles such that said ability of said one or more asymmetrical groupings to permit an equation of electrically detected relative positions of said one or more memory storage devices with physical positions of said memory storage devices within a memory storage device receptacle is preserved across said one or more of said memory storage device receptacles.

15. The apparatus of claim 12 further comprising means for autoconfiguring arrays of memory storage devices utilizing said asymmetrical groupings.

16. The apparatus of claim 12 wherein said means for determining further comprises means for determining constraints arising from the ability of said memory storage device receptacle's ability to physically accommodate said memory storage devices.

17. The apparatus of claim 12 wherein said means for determining further comprises means for determining constraints arising from any combination of hardware and software utilized by said memory storage device receptacles.

18. The apparatus of claim 12 wherein said means for determining further comprises means for determining constraints arising from the ability of said memory storage device receptacle's ability to physically accommodate said memory storage devices and constraints arising from any combination of hardware and software utilized by said memory storage device receptacles.

19. The apparatus of claim 12 wherein said means for determining further comprises means for defining characteristics of said redundant arrays that are to be autoconfigured from said memory storage devices.

20. The apparatus of claim 19 wherein said means for defining characteristics further comprises means for defining a number of disks to be utilized within said redundant arrays.

21. The apparatus of claim 20 wherein said means for defining characteristics further comprises means for defining functions for each of said defined number of disks to be utilized within said redundant arrays.

22. The apparatus of claim 15 wherein said means for autoconfiguring arrays further comprises:
    means for determining, on the basis of electrical sensing and said asymmetrical groupings, a number of said memory storage device receptacles and a positioning of one or more of said memory storage devices within said number of said memory storage device receptacles; and
    means for utilizing said determined positioning of one or more of said memory storage devices within said number of said memory storage device receptacles to autoconfigure said redundant arrays of memory storage device from said one or more memory storage devices within said number of said memory storage device receptacles.

23. A computer readable medium containing a program product for autoconfiguring redundant arrays of memory storage devices contained within one or more memory storage device receptacles where said receptacles have one or more slots containing hardware sufficient to accept and electrically communicate with said memory storage devices, said program product comprising:
    means for determining said memory storage device receptacle's capacity for accepting said memory storage devices;
    means for defining an initial positioning of one or more memory storage devices in at least one memory storage device receptacle based upon said determined capacity;

means for defining one or more asymmetrical groupings based upon said determined capacity, and said defined initial positioning, where said defined one or more asymmetrical groupings permit said redundant arrays of memory storage devices to be autoconfigured therefrom; and means for only adding additional memory storage devices into one or more of said memory storage device receptacles thereafter such that the ability of said defined one or more asymmetrical groupings to permit said redundant arrays to be autoconfigured therefrom is preserved such that redundant arrays of memory storage devices can be autoconfigured from said one or more memory storage devices.

24. The computer readable medium containing the program product of claim 23, wherein said signal bearing media further comprises recordable media.

25. The computer readable medium containing the program product of claim 23, wherein said signal bearing media further comprises transmission media.

26. The computer readable medium containing the program product of claim 23 wherein said means for defining one or more asymmetrical grouping further comprises means for defining said one or more asymmetrical groupings such that said one or more asymmetrical groupings permit an equation of electrically detected relative positions of said one or more memory storage devices with physical positions of said memory storage devices within a memory storage device receptacle.

27. The computer readable medium containing the program product of claim 26 wherein said means for only adding further comprises means for adding said memory storage devices into said one or more of said memory storage device receptacles such that said ability of said one or more asymmetrical groupings to permit an equation of electrically detected relative positions of said one or more memory storage devices with physical positions of said memory storage devices within a memory storage device receptacle is preserved across said one or more of said memory storage device receptacles.

28. The computer readable medium containing the program product of claim 23 further comprising means for autoconfiguring arrays of memory storage devices utilizing said asymmetrical groupings.

29. The computer readable medium containing the program product of claim 23 wherein said means for determining further comprises means for determining constraints arising from the ability of said memory storage device receptacle's ability to physically accommodate said memory storage devices.

30. The computer readable medium containing the program product of claim 23 wherein said means for determining further comprises means for determining constraints arising from any combination of hardware and software utilized by said memory storage device receptacles.

31. The computer readable medium containing the program product of claim 23 wherein said means for determining further comprises means for determining constraints arising from the ability of said memory storage device receptacle's ability to physically accommodate said memory storage devices and constraints arising from any combination of hard ware and software utilized by said memory storage device receptacles.

32. The computer readable medium containing the program product of claim 23 wherein said means for determining further comprises means for defining characteristics of said redundant arrays that are to be autoconfigured from said memory storage devices.

33. The computer readable medium containing the program product of claim 32 wherein said means for defining characteristics further comprises means for defining a number of disks to be utilized within said redundant arrays.

34. The computer readable medium containing the program product of claim 33 wherein said means for defining characteristics further comprises means for defining functions for each of said defined number of disks to be utilized within said redundant arrays.

35. The computer readable medium containing the program product of claim 28 wherein said means for autoconfiguring arrays further comprises:

means for determining, on the basis of electrical sensing and said asymmetrical groupings, a number of said memory storage device receptacles and a positioning of one or more of said memory storage devices within said number of said memory storage device receptacles; and means for utilizing said determined positioning of one or more of said memory storage devices within said number of said memory storage device receptacles to autoconfigure said redundant arrays of memory storage device from said one or more memory storage devices within said number of said memory storage device receptacles.

\* \* \* \* \*